US011878748B2

(12) United States Patent
Rahimzai et al.

(10) Patent No.: US 11,878,748 B2
(45) Date of Patent: Jan. 23, 2024

(54) FLUID CONTROLLER, IN PARTICULAR AS PART OF A HYDRAULIC STEERING UNIT

(71) Applicant: Danfoss Power Solutions ApS, Nordborg (DK)

(72) Inventors: Abdul Karim Rahimzai, Sønderborg (DK); Poul Ennemark, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 492 days.

(21) Appl. No.: 17/191,129

(22) Filed: Mar. 3, 2021

(65) Prior Publication Data
US 2021/0284228 A1 Sep. 16, 2021

(30) Foreign Application Priority Data
Mar. 10, 2020 (DE) .......................... 102020106438.1

(51) Int. Cl.
*B62D 5/08* (2006.01)
*B62D 5/06* (2006.01)
(Continued)

(52) U.S. Cl.
CPC ............. *B62D 5/087* (2013.01); *B62D 5/065* (2013.01)

(58) Field of Classification Search
CPC ................................ B62D 5/087; B62D 5/065
See application file for complete search history.

(56) References Cited

U.S. PATENT DOCUMENTS 2,798,461 A 7/1957 Gold et al.
2,827,976 A 3/1958 Brand
(Continued)

FOREIGN PATENT DOCUMENTS

CN 1174148 A 2/1998
CN 1179517 A 4/1998
(Continued)

OTHER PUBLICATIONS

First Examination Report for Indian Serial No. 202114001805 dated Feb. 10, 2022.
(Continued)

*Primary Examiner* — Kevin R Barss
(74) *Attorney, Agent, or Firm* — McCormick, Paulding & Huber PLLC (57) ABSTRACT

A fluid controller (1), in particular as part of a hydraulic steering unit, is described said controller (1) comprising a housing (2) having a supply port arrangement, a sleeve (4) arranged rotatably in a bore of the housing (2), a spool (3) arranged rotatably in the sleeve (4), and a measuring motor, wherein the measuring motor comprises a plurality of working chambers, each working chamber being connected to the bore, wherein the sleeve (4) comprises a commutation geometry (7) having a first partition and controlling together with a housing geometry (5) of the housing (2) a flow of hydraulic fluid into and out of the working chambers and the spool (3) comprises a spool geometry (14) controlling together with a valve geometry (10, 11) of the sleeve (4) a flow of hydraulic fluid between the supply port arrangement and the commutation geometry. Such a fluid controller should have a stable control behavior. To this end the valve geometry (10,11) comprises a second partition different from the first partition.

20 Claims, 5 Drawing Sheets

(51) Int. Cl.
  *B62D 5/087* (2006.01)
  *B62D 5/065* (2006.01)

(56) References Cited

U.S. PATENT DOCUMENTS

| | | | |
|---|---|---|---|
| 2,984,215 | A | 5/1961 | Charlson |
| 3,528,521 | A | 9/1970 | Ellis |
| 3,658,449 | A | 4/1972 | Woodling |
| 3,739,577 | A | 6/1973 | Nagase et al. |
| 3,801,239 | A | 4/1974 | Larson |
| 3,805,838 | A | 4/1974 | Christensen |
| 3,819,307 | A | 6/1974 | Uppal |
| 3,937,601 | A | 2/1976 | Miller |
| 3,964,371 | A | 6/1976 | Wagner et al. |
| 4,174,612 | A | 11/1979 | Liebert |
| 4,270,349 | A | 6/1981 | Ljubimov et al. |
| 4,311,171 | A | 1/1982 | Roberts |
| 4,409,789 | A | 10/1983 | Tansen et al. |
| 4,452,274 | A | 6/1984 | Haga et al. |
| 4,671,747 | A | 6/1987 | Arbjerg |
| 4,711,315 | A | 12/1987 | Kitamura |
| 4,923,170 | A | 5/1990 | Takaoka et al. |
| 4,934,911 | A | 6/1990 | Schulz |
| 5,101,860 | A | 4/1992 | Stephenson |
| 5,273,072 | A | 12/1993 | Phillips |
| 5,435,698 | A | 7/1995 | Phillips |
| 5,505,119 | A | 4/1996 | Phillips |
| 5,701,970 | A | 12/1997 | Arbjerg |
| 5,725,023 | A | 3/1998 | Padula |
| 5,730,040 | A | 3/1998 | Strong |
| 5,845,736 | A | 12/1998 | Bohner et al. |
| 6,182,786 | B1 | 2/2001 | Rom |
| 6,237,331 | B1 | 5/2001 | Sorensen |
| 6,318,078 | B1 | 11/2001 | Novacek et al. |
| 6,769,451 | B2 | 8/2004 | Hjelsand |
| 6,863,147 | B2 | 3/2005 | Catellani |
| 7,364,006 | B2 | 4/2008 | Birsching et al. |
| 7,610,935 | B2 | 11/2009 | Arbjerg |
| 9,211,907 | B2 | 12/2015 | Kubo et al. |
| 2003/0006097 | A1 | 1/2003 | Sahr et al. |
| 2006/0075747 | A1 | 4/2006 | Shiina et al. |
| 2011/0283694 | A1 | 11/2011 | Smith et al. |
| 2012/0097471 | A1 | 4/2012 | Sakamaki et al. |
| 2018/0009471 | A1 | 1/2018 | Novacek |
| 2018/0105203 | A1 | 4/2018 | Takenaka et al. |
| 2019/0031233 | A1 | 1/2019 | Bergmann et al. |
| 2020/0108862 | A1 | 4/2020 | Pippes et al. |

FOREIGN PATENT DOCUMENTS

| | | |
|---|---|---|
| CN | 1189134 A | 7/1998 |
| CN | 1260305 A | 7/2000 |
| CN | 1997541 A | 7/2007 |
| CN | 101970277 A | 2/2011 |
| CN | 104024088 A | 9/2014 |
| DE | 2015897 A1 | 10/1971 |
| DE | 2906183 A1 | 8/1980 |
| DE | 4204336 A1 | 8/1993 |
| DE | 4241036 C1 | 4/1994 |
| DE | 102006026394 A1 | 2/2007 |
| EP | 2610139 A1 | 3/2013 |
| FR | 1495400 A | 9/1967 |
| GB | 1342503 | 1/1974 |
| JP | S50-4731 U | 1/1975 |
| JP | 59230864 | 12/1984 |
| KR | 970041001 | 7/1997 |
| KR | 2006-0061663 A | 6/2006 |
| KR | 20080010529 | 1/2008 |
| WO | 03093089 | 11/2003 |
| WO | 2008069552 | 6/2008 |

OTHER PUBLICATIONS

First Examination Report for Indian Serial No. 202114002243 dated Feb. 11, 2022.
First Examination Report for Indian Serial No. 202114002244 dated Jan. 18, 2022.
Office Action issued for Chinese Patent Application No. 202110181366.3, dated May 30, 2023 and its English translation.

FLUID CONTROLLER, IN PARTICULAR AS PART OF A HYDRAULIC STEERING UNIT

CROSS-REFERENCE TO RELATED APPLICATION

This application claims foreign priority benefits under 35 U.S.C. § 119 to German Patent Application No. 102020106438.1 filed on Mar. 10, 2020, the content of which is hereby incorporated by reference in its entirety.

TECHNICAL FIELD

The present invention relates to a fluid controller, in particular as part of a hydraulic steering unit, said controller comprising a housing having a supply port arrangement, a sleeve arranged rotatably in a bore of the housing, a spool arranged rotatably in the sleeve, and a measuring motor, wherein the measuring motor comprises a plurality of working chambers, each working chamber being connected to the bore, wherein the sleeve comprises a commutation geometry having a first partition and controlling together with a housing geometry of the housing a flow of hydraulic fluid into and out of the working chambers and the spool comprises a spool geometry controlling together with a valve geometry of the sleeve a flow of hydraulic fluid between the supply port arrangement and the commutation geometry.

BACKGROUND

Such a fluid controller is known, for example, from U.S. Pat. No. 7,610,935 B2.

In the following a steering unit is used as example for such a fluid controller. However, the invention is not limited to a steering unit.

A steering unit is used to supply a certain amount of hydraulic fluid to a steering motor or steering actuator which is connected to the steering unit. The steering unit in turn is connected to a steering wheel or another steering command means. When the steering wheel is rotated, the spool is rotated in relation to the sleeve. This rotation opens orifices which are formed by the spool geometry and the valve geometry. The fluid passing these orifices is supplied to the commutation geometry which in turn supplies the fluid via the housing geometry to the working chambers of the measuring motor. The measuring motor can be, for example, a gerotor motor or gear set having a number of working chambers. Each working chamber is connected to a section of the housing geometry.

The fluid arriving at the measuring motor drives the measuring motor. The measuring motor is connected to the sleeve and restores the sleeve to an initial position. The fluid driving the measuring motor is supplied to the steering motor.

SUMMARY

An object of the invention is to achieve a stable control behaviour.

This object is solved in that the valve geometry comprises a second partition different from the first partition.

In the following a steering unit is used as an example to describe the construction and function of the fluid controller. However, the invention is not limited to a hydraulic steering unit.

In the present example the measuring motor is a gerotor motor comprising a star wheel having six outer teeth and a star ring having seven inner teeth. Accordingly, the measuring motor comprises seven working chambers. Each working chamber is connected to the bore via a channel, the channel ending in an opening in the bore and the openings together form the housing geometry.

In the prior art the sleeve comprises six pairs of bores. Thus, the commutation geometry has a partition of 6. The spool comprises likewise six pairs of bores having likewise a partition of 6. The spool is supplied with hydraulic fluid under pressure in one axial half and returns hydraulic fluid to tank or another low pressure region in the other axial half of the spool.

When the spool is rotated in relation to the sleeve, for example, when a steering wheel is rotated, orifices are opened to allow a fluid to pass from the spool to the sleeve and from there to the housing and vice versa from the housing through the sleeve to the spool.

Since there are six pairs of bores in the sleeve and the same number of bores in the spool and the spool can be rotated in both directions in relation to the sleeve, there is a maximum angle of rotation of 30°, i.e. 15° in each direction of rotation.

The small angle of relative rotation between the spool and the sleeve bears the risk of an instable control behaviour.

This risk can be substantially reduced by changing the relation between the commutation geometry and the valve geometry. According to the invention the valve geometry and the commutation geometry are decoupled. This makes it possible to use different partitions or partition angles for the commutation geometry on the one hand and for the valve geometry on the other hand. The partition angle is the width of each partition in circumferential direction. Accordingly, the spool can be rotated in relation to the sleeve independently of the partition angle of the commutation geometry, so that the limitation of the angle of rotation is no longer a bar for the stability of the control behaviour.

In an embodiment of the invention the commutation geometry and the valve geometry are located at different positions. This is a simple way to realize different partitions.

In an embodiment of the invention the commutation geometry and the valve geometry are located at different axial positions with respect to an axis of the bore. Thus, it is possible to supply fluid to one axial side of the spool and to return the fluid from the other side of the spool.

In an embodiment of the invention the commutation geometry and the valve geometry are connected to each other via a fluid channel arrangement which is located outside the interior of the sleeve. Accordingly, it is no longer necessary to supply fluid to the commutation geometry in area in which the commutation geometry is arranged. The sleeve can be closed to the radially inner side in the region of the commutation geometry.

In an embodiment of the invention the fluid channel arrangement is in form of surface channels located on the radially outer side of the sleeve. Accordingly, the fluid channel arrangement is formed between the sleeve and the housing.

In an embodiment of the invention the fluid channel arrangement comprises a ring-shaped section running in circumferential direction of the spool. The ring-shaped section can be provided for a supply channel and for a cylinder channel. The ring-shaped section allows an even distribution of the fluid over the circumference of the sleeve.

In an embodiment of the invention the commutation geometry is in form of a surface structure. As mentioned above, it is no longer necessary to have bores in the commutation geometry. The commutation geometry can be in form of recesses, wherein the recesses are connected to the ring-shaped section of the respective channels, if necessary.

In an embodiment of the invention the partition angle of the commutation geometry is smaller than the partition angle of the valve geometry. Independently of the measuring motor used, a large angle of rotation between the spool and the sleeve is possible.

In an embodiment of the invention the partition angle of the commutation geometry is 45° or less. It is accordingly possible to use the commutation geometry for control of a measuring motor having five or more working chambers. The commutation geometry can be the partition angle known from the prior art, for example, the above-mentioned 30°. Since the commutation geometry and the valve geometry are decoupled, it is possible to use a larger partition angle for the valve geometry.

In an embodiment of the invention the partition angle of the valve geometry is 60° or more. Accordingly, a stable control behaviour can be achieved.

In an embodiment of the invention the partition angle of the valve geometry is 90°. This has two advantages. On the one hand, a rather large rotation is allowed between the spool and the sleeve. On the other hand, the pressure distribution on the spool and the sleeve can be made even, so that the risk of deformation of spool and sleeve is quite small.

In an embodiment of the invention the valve geometry comprises a supply section and a return section, wherein the supply section and the return section are arranged on different sides of the housing geometry. This facilitates supply and return of hydraulic fluid to the commutation geometry. Fluid can be supplied to one axial side and can be returned from the other axial side of the commutation geometry.

In an embodiment of the invention the valve geometry comprises a pressure supply area extending in an axial direction on both sides of the housing geometry. Accordingly, the distribution of the pressure acting on the sleeve can be made even in axial direction to avoid a deformation of the sleeve.

In an embodiment of the invention the pressure supply area comprises a first part on one side of the housing geometry and a second part on the other side of the housing geometry, the first part and the second part running in circumferential direction, wherein the first part and the second part are connected by a third part running in axial direction and having a width in circumferential direction smaller than the first part and the second part. In other words, the pressure supply area is in form of a "H", wherein the horizontal section of the "H" is arranged in parallel to the axis rotation of the spool. When, for example, the pressure supply area is formed by a surface structure, this form of the pressure supply area avoids a weakening of the spool.

BRIEF DESCRIPTION OF THE DRAWINGS

An embodiment of the invention will now be described in more detail with reference to the drawings, wherein:

FIG. 4b shows a section A-A of FIG. 4a,

FIG. 4c shows a section B-B of FIG. 4a,

FIG. 4d shows a section C-C of FIG. 4a,

FIG. 5b shows a sectional view A-A of FIG. 5a, FIG. 5c shows a sectional view B-B of FIG. 5a, FIG. 5d shows a sectional view C-C of FIG. 5a, FIG. 6a shows an illustration as in FIG. 5a of a further embodiment of the invention.

DETAILED DESCRIPTION

Figure 7:
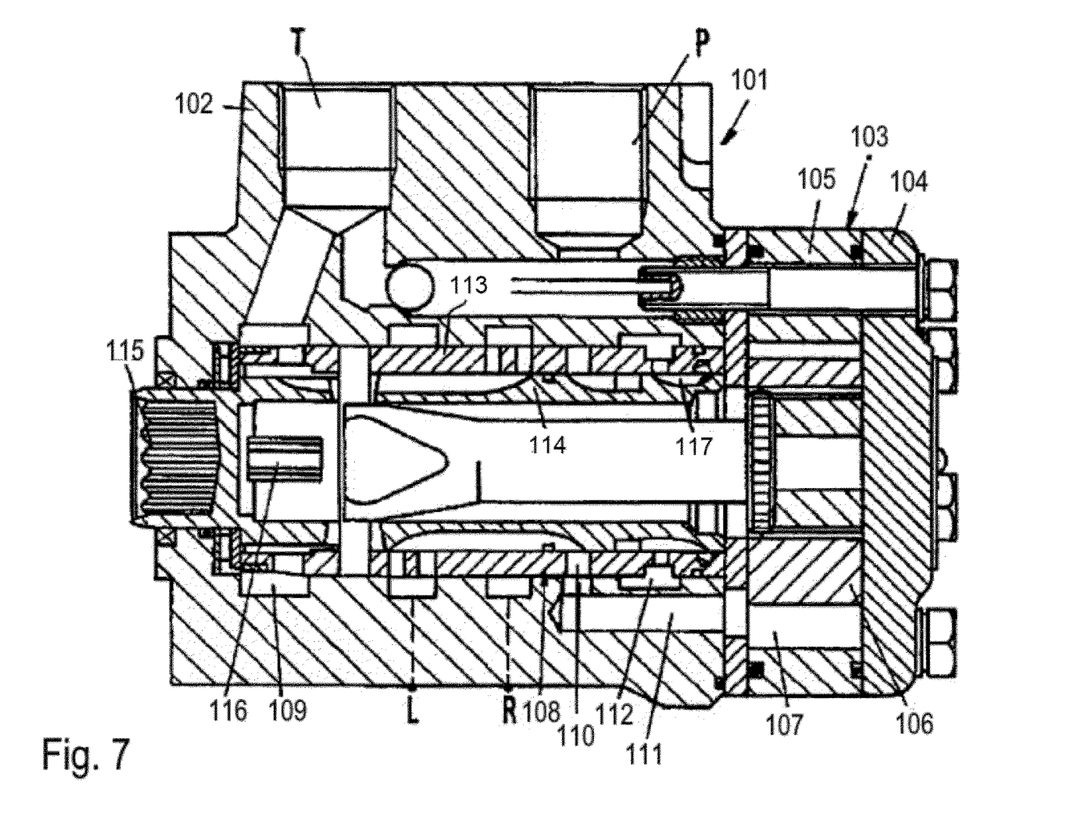

FIG. 7 illustrates a control device 101 comprising a housing 102, a fluid meter 103, and an end plate 104. The inlet P is connected to a pump and the outlet T is connected to a system reservoir from which the pump receives the fluid. The control ports are not visible in the shown cross section but the letters L and R point at annular chambers to which the control ports are in communication. The fluid meter 103 comprises a stationary gear ring 105 (or star ring) having internal teeth, and a rotating and planetary gear 106 (or star wheel) having external teeth. The gears form volume chambers 107 which expand and contract during the movement of the external teeth between the internal teeth.

A valve member 108 is rotatably disposed in the housing in which an annular chamber 109 is in communication with the outlet T. L is connected to one end of a steering cylinder and R is connected to the other end of the steering cylinder via control ports which as aforementioned are not shown in the FIG. 1 and R form working ports or direction ports. A plurality of meter ports 10 provided in the valve member 108 communicate between the volume chambers 107 via the axial passages 111 which are provided in the housing. The annular chamber 112 is in communication with the inlet P and thereby with the fluid under pressure delivered by the pump.

The valve member 108 comprises a sleeve 113 and a spool 114. The spool comprises a coupling end 115 which is driven by the operator of a vehicle via a drive wheel. The spool and the sleeve can be turned relatively to each other through a predetermined angle in both directions out of a neutral position against the force of radial leaf springs 116. The planetary gear 106 and thereby the displacement of the fluid out of the chambers of the fluid meter is driven by the sleeve via a pin and a cardan shaft 117 connected between the sleeve and the planetary gear. When the resistance against the displacement of the fluid exceeds the rigidity of the spring 116, the sleeve starts to slip and rotates relative to the spool whereby the spool moves from the neutral configuration to an operating configuration whereby the valve member establishes a passage between the inlet P and one of the control ports (L, R) and between the other control port and the outlet T, respectively.

Figures 1, 2, 3:
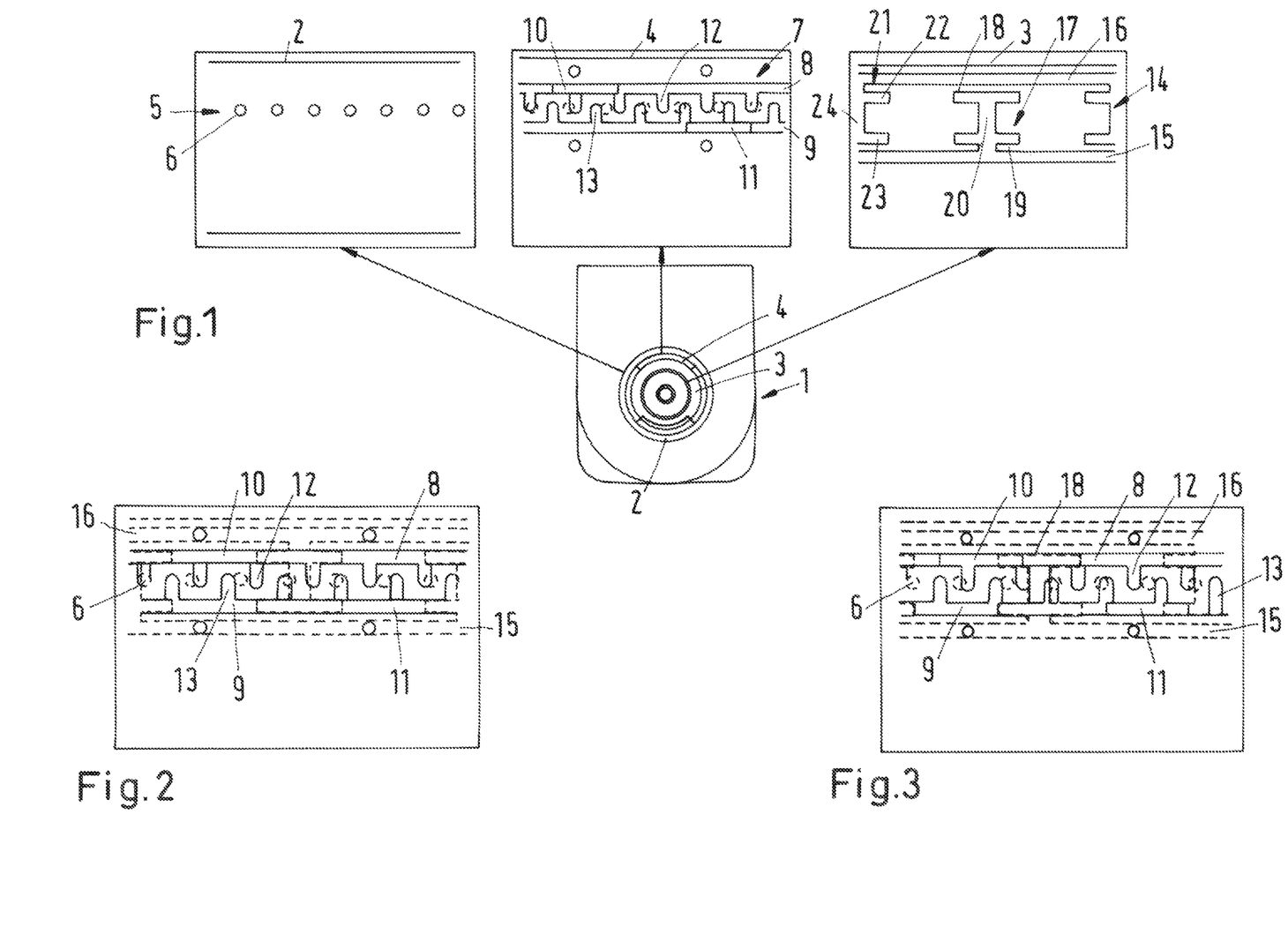
FIG. 1 shows schematic views of different parts of the fluid controller.
FIG. 2 shows a view of the fluid controller in neutral position.
FIG. 3 shows a view of the fluid controller in working position.

FIG. 1 shows schematically parts of a fluid controller 1, more precisely a housing 2, a spool 3 and a sleeve 4.

A housing geometry 5 comprises a number of bores 6 which are arranged in the inner circumferential wall of a bore in the housing 2 which accommodates the sleeve 4 and the spool 3.

In the present example the fluid controller 1 comprises a measuring motor (not shown) having seven working chambers which are formed between a star wheel having six outer teeth and a star ring having seven inner teeth. Each of the working chambers is connected to one of the bores 6 as it is known from prior art fluid controllers. Accordingly, it is possible to supply the working chambers with hydraulic fluid under pressure and to return hydraulic fluid from the working chambers to housing geometry 5.

The sleeve 4 comprises a commutation geometry 7. The commutation geometry 7 is in form of a surface structure on the radially outer surface of the sleeve 4. The commutation geometry 7 is connected to a first groove 8 running in circumferential direction and a second groove 9 running in circumferential direction. The first groove 8 is connected to a first through-going opening 10 connecting the groove 8 to the radially inner side of the sleeve 4 and the second groove 9 is connected to a second through-going opening 11 connecting the second groove 9 to a radially inner side of the sleeve 4.

In the example shown the first groove 8 and the first opening 10 are located at the same axial position and the second groove 9 and the second opening 11 are located at the same axial position as well. This is, however, not necessary as long as a connection between the first groove 8 and the first opening 10 and a connection between the second groove 9 and the second opening 11 is provided.

The first groove 8 is connected to six first branches 12 (or first commutation grooves) and the second groove 9 is connected to six second branches 13 (or second commutation grooves). The first branches 12 extend perpendicular from the first groove 8 to an axial position of the sleeve 4 in which the bores 6 of the housing geometry 5 are arranged. The second branches 13 extend likewise perpendicular from the second groove 9 to an axial position in which the bores 6 of the housing geometry are arranged, however, in opposite axial direction.

When the sleeve 4 is rotated in relation to the housing 2, the branches 12, 13 come into an overlapping relation with the bores 6 of the housing geometry 5.

The first branches 12 (or first commutation grooves) and the second branches 13 (or second commutation grooves) form the commutation geometry 7. Depending on the positions of the first and second branches 12, 13 in relation to the openings 6, some of the working chambers of the measuring motor are supplied with hydraulic fluid under pressure and the other working chambers can return the hydraulic fluid to the bore.

The openings 10, 11 form a valve geometry. A distance between the openings 10, 11 in circumferential direction corresponds preferably to a length of the openings 10, 11 in circumferential direction. The length of the first opening 10 is equal to the length of the second opening 11 in circumferential direction.

The spool 3 comprises a spool geometry 14. The spool geometry 14 comprises a supply channel 15 and a cylinder channel 16. The supply channel 15 is connected to a pressure source, so that it is able to receive hydraulic fluid under an elevated pressure. The cylinder channel 16 is connected to a cylinder port or direction port, so that it is possible to supply fluid to the cylinder port via the cylinder channel 16 or to receive fluid from there.

The connection between the supply channel 15 and the cylinder channel 16 to the pressure source or the tank, respectively, can be made in different ways. One possibility is to divide the interior of the spool 3 in axial direction in a high pressure chamber and in a low pressure chamber and to connect the supply channel 15 to the high pressure chamber and the cylinder channel 16 to the low pressure chamber. Other supply and return solutions are possible.

A pressure supply area 17 extends from the supply channel 15. The pressure supply area 17 comprises a first part 18 on one side of the housing geometry 5 in axial direction and a second part 19 on the other side of the housing geometry 5 in axial direction. The first part 18 and the second part 19 run in circumferential direction. The first part 18 and the second part 19 are connected by a third part 20. The third part 20 is extended to connect the second part 19 to the supply channel 15.

The first part 18 and the second part 19 have a width in circumferential direction which is larger than the corresponding width of the third part 20. The pressure supply area 17 is in form of a surface structure on the radially outer surface of spool 3.

The pressure supply area 17 is in form of a "H", wherein the legs of the "H" are arranged in circumferential direction of the spool.

A corresponding pressure return area 21 is provided in connection with the cylinder channel 16. The pressure return area 21 corresponds in similar manner a first part 22, a second part 23 and a third part 24 connecting the first part 22 and the second part 23.

It should be noted that the third part 20, 24 of the pressure supply area 17 and the pressure return area 21, respectively, can have the same width in circumferential direction as the first and second part 18, 19; 22, 23.

FIG. 2 shows the relation between the housing geometry 5, the commutation geometry 7, the valve geometry 10, 11 and the spool geometry 14 for a neutral or closed condition of the controller 1. The commutation geometry 7 is shown in full lines. The spool geometry 14 is shown in dotted lines and the housing geometry 5 is shown in dashed lines.

It can be seen that the first opening 10 and the second opening 11 are closed by the sleeve 4. The first opening 10 and the second opening 11 do not overlap any of first part 18 or second part 19 of the pressure supply area 17 or of a corresponding area connected to the cylinder channel 16.

The first branches 12 and the second branches 13 are in partly overlapping relation to the bores 6 of the housing geometry 5. However, since the valve geometry 10, 11 and the spool geometry 14 do not form openings through which hydraulic fluid can pass, no fluid is passed to the measuring motor.

FIG. 3 shows a situation in which the spool 3 and the sleeve 4 have been rotated in relation to each other. In this situation the first part 18 of the pressure supply area 17 comes in overlapping relation with the first opening 10 and accordingly the first groove 8 is supplied with hydraulic fluid under pressure. This hydraulic fluid under pressure is transferred to the first branches 12 and consequently supplied to some of the bores 6 of the housing geometry 5.

Other bores 6 of the housing geometry are in overlapping relation with the second branches 13 of the second groove 9, so that hydraulic fluid returning from the measuring motor can reach the second groove 9 and arrive at the cylinder channel 16 via the second opening 11.

It can be seen that the relative rotation between the spool 3 and the sleeve 4 is not limited by the angular distance between the openings 6 of the housing geometry 5 or by the angular distance between the branches 12, 13 of the commutation geometry 7.

It is possible to rotate spool 3 and sleeve 4 over an angle of 90° (45° in both directions). When rotated to the maximum angle, the first part 18 of the pressure supply area 17 comes in fully overlapping relation to the first opening 10 and the corresponding part of the area connected to the cylinder channel 16 comes in fully overlapping relation to the second opening 11. Accordingly, small variations in the angular relation between the spool 3 and the sleeve 4 do not change the fluid supply and return condition to commutation geometry 7.

The invention can also be illustrated in connection with FIGS. 4 to 6.

FIG. 4 shows schematically a fluid controller according to the prior art.

Same elements as in FIGS. 1 to 3 are designated with the same reference numerals.

In order to show the different pressures, characters C and P are used. P represents the supply pressure, i.e. a pressure at a pressure port. C represents a "cylinder pressure", i.e. a pressure at a working port or direction port.

The pressures A, B represent the pressures in second circumferential groove 9 and the first circumferential groove 8, respectively.

Figure 4A:
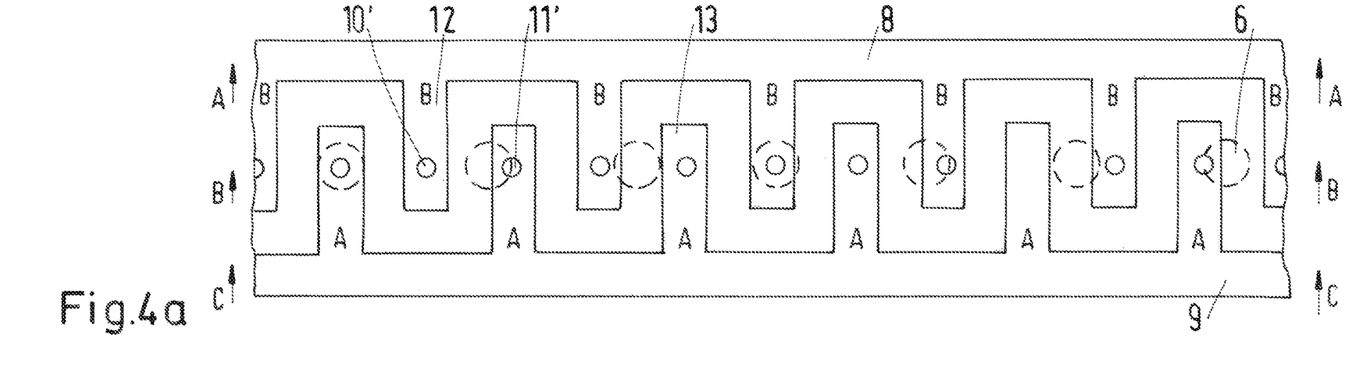
FIG. 4a shows a flatted view of the circumference of the sleeve 4.

FIG. 4a shows a flatted view of the circumference of the sleeve 4. It can be seen that the branches 12, 13 partly overlap the bores 6 of the housing 2. As mentioned above, each bore 6 is connected with a working chamber of the measuring motor which is in the form of a gear set.

Each first branch 12 is provided with an opening 10' and each second branch 13 is provided with an opening 11', wherein the openings 10', 11' pass through the sleeve 4.

Figure 4B:
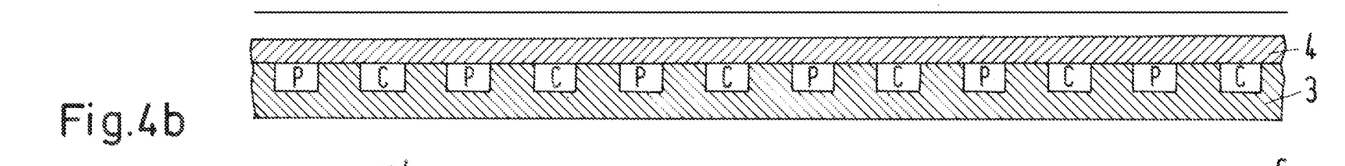
Figure 4C:
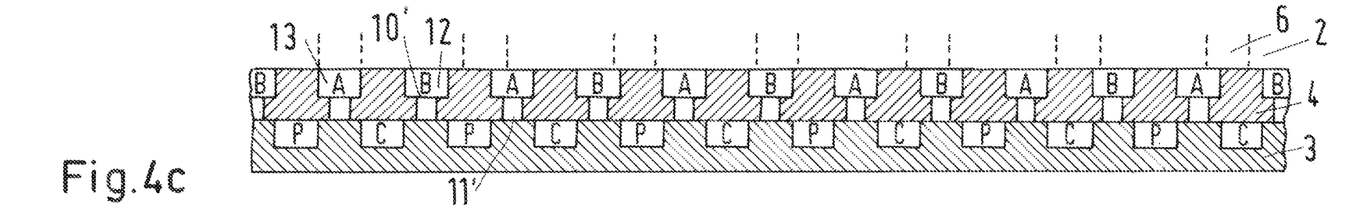
Figure 4D:
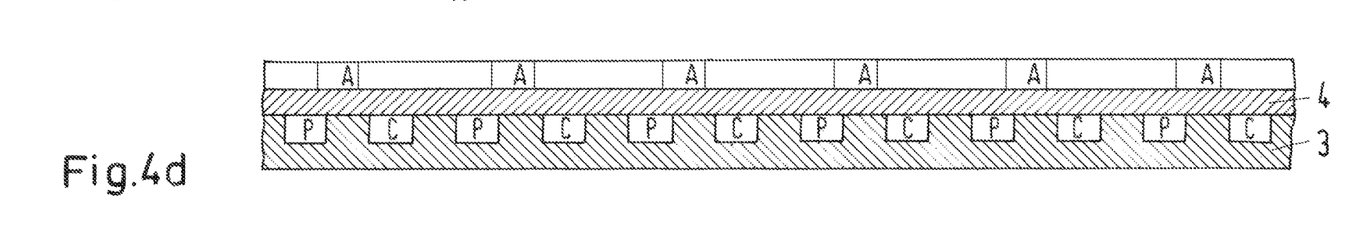

FIG. 4b is a section A-A of FIG. 4a, FIG. 4c is a section B-B of FIG. 4a and FIG. 4d is a section C-C of FIG. 4a. FIGS. 4b to 4c show the set of spool 3 and sleeve 4 in neutral position. Openings 10', 11' are closed by the sleeve.

When the spool 3 is moved in relation to the sleeve 4 to the right hand side (directions relate to the view shown in FIGS. 4b to 4d) then the openings 11' come in overlapping relation with grooves in the spool 3 having the pumping pressure P, whereas the other openings 10' come in overlapping relation with grooves carrying the cylinder pressure C. Thus, the branches 12, 13 have different pressures which are transmitted (via the commutation geometry 7) to the working chambers of the measuring motor.

Figure 5A:
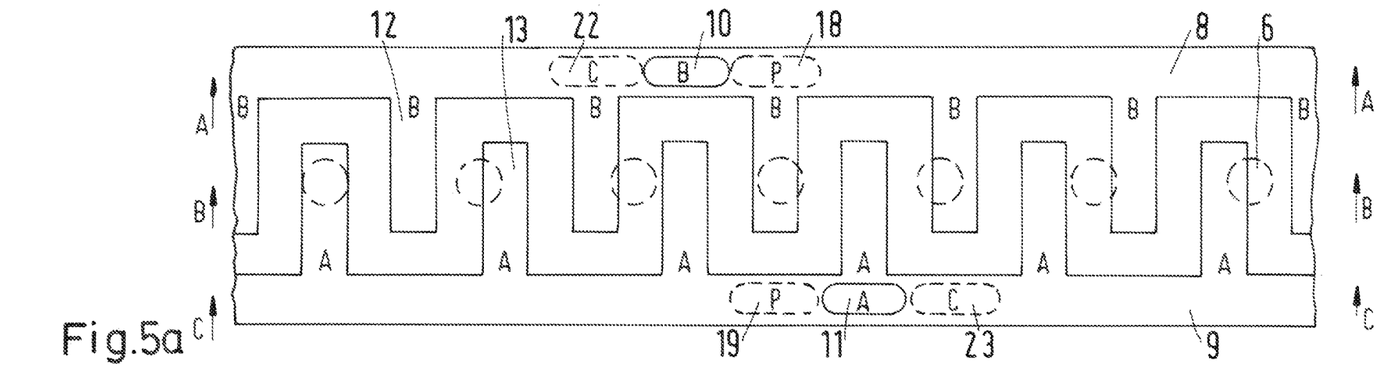
FIG. 5a shows an illustration similar to FIG. 4a, however, of another embodiment of the invention.
Figures 5B, 5C:
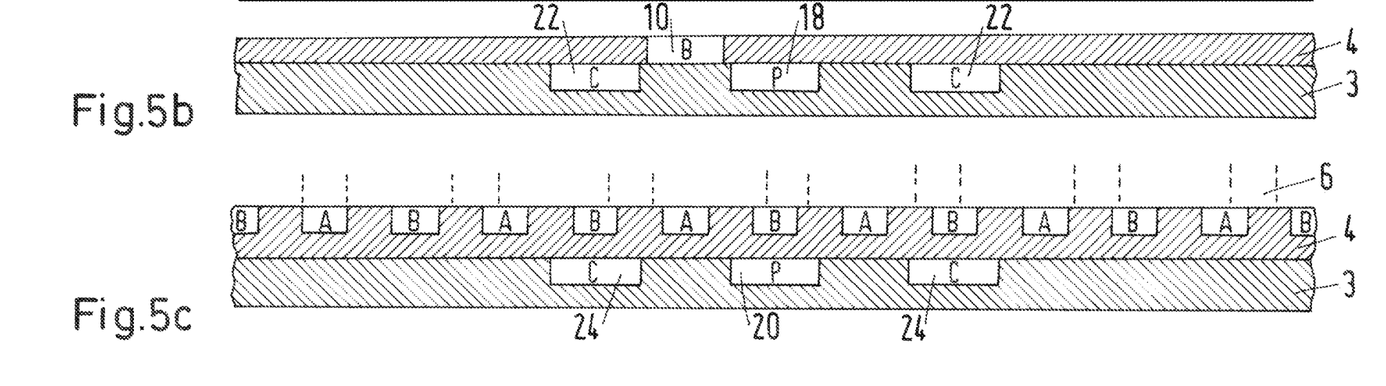
Figure 5D:
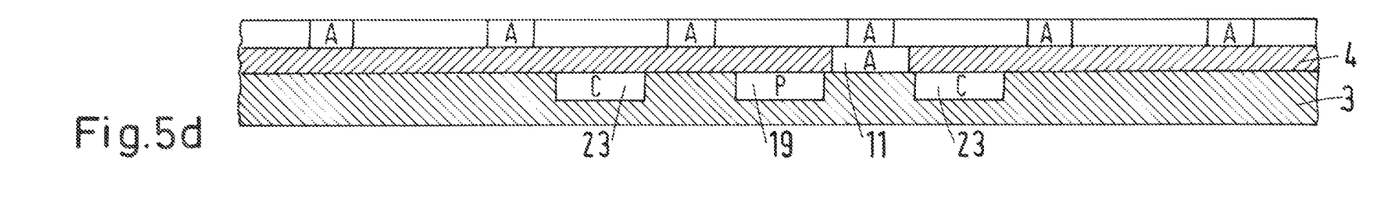
Figure 6A:
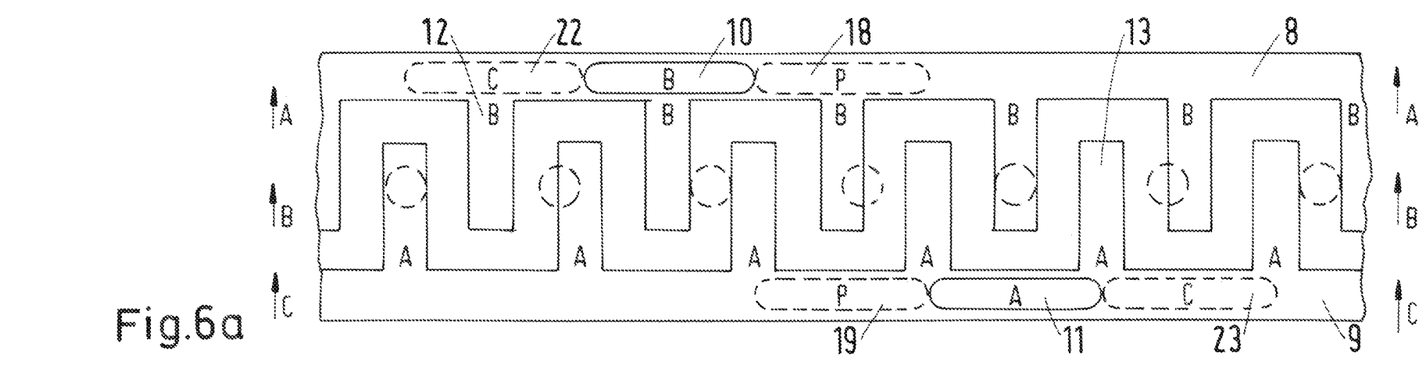
Figure 6B:
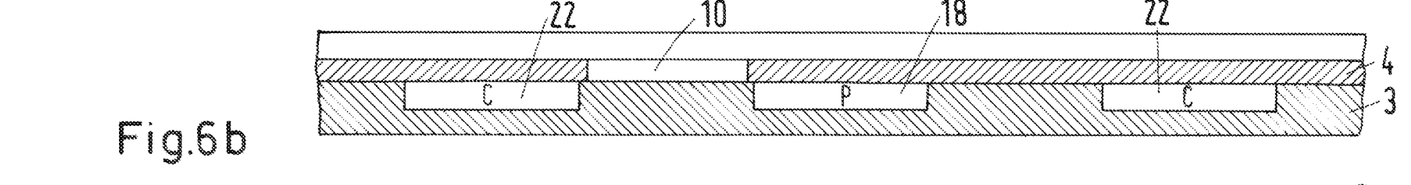
FIG. 6b shows a sectional view A-A of FIG. 6a, FIG. 6c shows a sectional view B-B of FIG. 6a, FIG. 6d shows a sectional view C-C of FIG. 6a, and FIG. 7 shows a schematically a fluid controller in a sectional view.
Figure 6C:
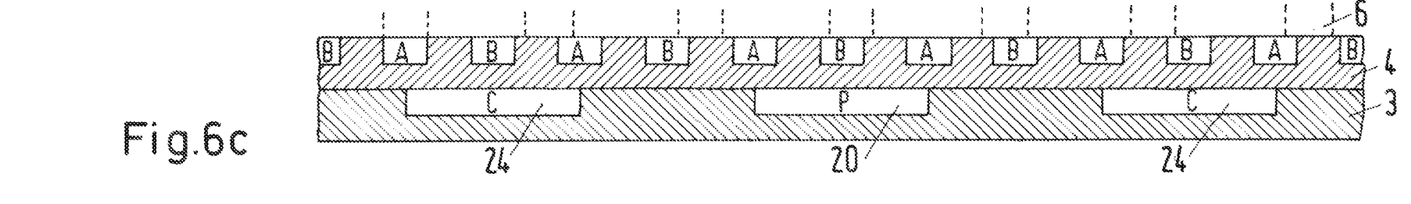
Figure 6D:
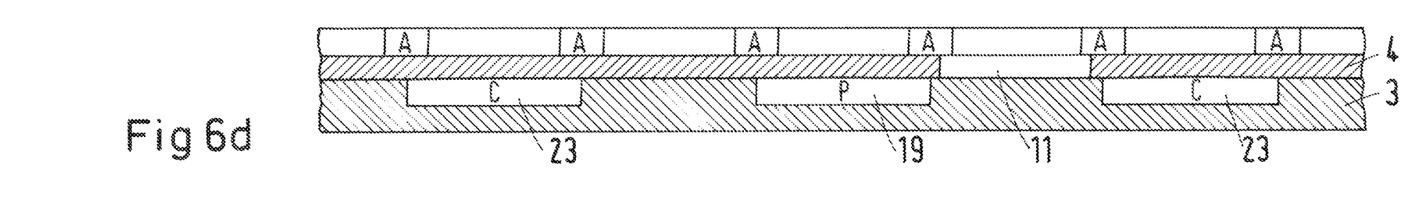

In an embodiment of the invention shown in FIG. 5 some modifications have been made.

The commutation geometry 7 is basically unchanged. The branches 12, 13 (or commutation grooves) are partially in overlapping relation with the bores 6 of the housing 2. This overlapping relation changes when the sleeve 4 is rotated. However, this commutation geometry is used to supply and return hydraulic fluid to the measuring motor, more precisely to supply fluid to working chambers having an increasing volume and to return hydraulic fluid from working chambers having a decreasing volume. The commutation geometry has a partition of 6 like the prior art.

However, the position of the openings 10, 11 and of the spool geometry has been changed.

Opening 10 is now arranged in the bottom of the circumferential groove 8 and the opening 11 is arranged in the bottom of circumferential groove 9.

The spool geometry comprises again a pressure supply area 17 having a first part 18, a second part 19 and a third part 20 connecting the first part 18 and the second part 19.

The pressure return area 21 comprises likewise a first part 22, a second part 23 and a third part 24 connecting the first part 22 and the second part 23. In the embodiment shown in FIG. 5, the third part 20 of the pressure supply area 17 and the third part 24 of the pressure return area 21 have the same width in circumferential direction as the first and second parts 18, 19; 22, 23 of the pressure supply area 17 and the pressure return area 21, respectively.

Again, 5b shows a sectional view A-A of FIG. 5a, FIG. 5c shows a sectional view B-B of FIG. 5a, and FIG. 5d shows a sectional view C-C of FIG. 5a. FIG. 5b-5d show the set of spool 3 and sleeve 4 in neutral position.

In the neutral position the openings 10, 11 in the sleeve 4 are closed by the spool 3.

However, when the spool 3 is moved to the right hand side (as shown in FIG. 5) the opening 11 receives pressure P from the second part 19 of the pressure supply area 17 and this pressure is transmitted to the second branches 13. At the same time the opening 10 comes in overlapping relation with the cylinder pressure C in the first part 22 of the pressure return area 21 and this pressure is transmitted to the first branches 12.

However, there is no necessity to use a number of first openings 10 or second openings 11 which number corresponds to a number of the pair of branches 12, 13 of the commutation geometry 7. There are only three pressure supply areas 17 and three pressure return areas 21 in circumferential direction. Thus, the valve geometry has a partition of 3.

Since it is possible to use a smaller number of first openings 10 and second openings 11, these openings can be arranged with a larger distance in circumferential direction to each other and they can be made with a larger width in circumferential direction, so that the spool 3 and the sleeve 4 can be rotated in relation to each other with a larger angle which improves the control behaviour of a steering using such a fluid controller.

In the embodiment according to the prior art shown in FIG. 4 it is possible to rotate spool 3 and sleeve 4 over an angle of +−15°. In the embodiment shown in FIG. 5 it is possible to rotate spool 3 and sleeve 4 with an angle of ±30° in relation to each other.

FIG. 6 shows another embodiment in which it is possible to rotate spool 3 and sleeve 4 over an angle of ±60° in relation to each other.

In summary, the commutation geometry 7 and the valve geometry 10, 11 comprise different partition angles. The commutation geometry 7 and the valve geometry 10, 11 are located at different axial positions with respect to an axis of the bore 2. The commutation geometry 7 and the valve geometry 10, 11 are connected to each other via a fluid channel arrangement which is located outside the interior of the sleeve 4. The channel arrangement is in form of surface channel, for example grooves 8, 9, located on the radially outer side of the sleeve 4. The grooves run in circumferential direction of the sleeve are thus ring-shaped.

The commutation geometry 7 is in form of a surface structure on the radially outer surface of the sleeve 4. The commutation geometry 7 does not require through-going bores.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A fluid controller, in particular as part of a hydraulic steering unit, said controller comprising a housing having a supply port arrangement, a sleeve arranged rotatably in a bore of the housing, a spool arranged rotatably in the sleeve, and a measuring motor, wherein the measuring motor comprises a plurality of working chambers, each working chamber being connected to the bore, wherein the sleeve comprises a commutation geometry having a first partition and controlling together with a housing geometry of the housing a flow of hydraulic fluid into and out of the working chambers and the spool comprises a spool geometry controlling together with a valve geometry of the sleeve a flow of hydraulic fluid between the supply port arrangement and the commutation geometry, wherein the valve geometry comprises a second partition different from the first partition.

2. The fluid controller according to claim 1, wherein the commutation geometry and the valve geometry are located at different positions.

3. The fluid controller according to claim 2, wherein the commutation geometry and the valve geometry are located at different axial positions with respect to an axis of the bore.

4. The fluid controller according to claim 3, wherein the commutation geometry and the valve geometry are connected to each other via a fluid channel arrangement which is located outside the interior of the sleeve.

5. The fluid controller according to claim 3, wherein the commutation geometry is in form of a surface structure.

6. The fluid controller according to claim 2, wherein the commutation geometry and the valve geometry are connected to each other via a fluid channel arrangement which is located outside the interior of the sleeve.

7. The fluid controller according to claim 2, wherein the commutation geometry is in form of a surface structure.

8. The fluid controller according to claim 1, wherein the commutation geometry and the valve geometry are connected to each other via a fluid channel arrangement which is located outside the interior of the sleeve.

9. The fluid controller according to claim 8, wherein the fluid channel arrangement is in form of surface channels located on the radially outer side of the sleeve.

10. The fluid controller according to claim 9, wherein the fluid channel arrangement comprises a ringshaped section running in circumferential direction of the sleeve.

11. The fluid controller according to claim 9, wherein the commutation geometry is in form of a surface structure.

12. The fluid controller according to claim 8, wherein the commutation geometry is in form of a surface structure.

13. The fluid controller according to claim 1, wherein the commutation geometry is in form of a surface structure.

14. The fluid controller according to claim 1, wherein the partition angle of the commutation geometry is smaller than the partition angle of the valve geometry.

15. The fluid controller according to claim 1, wherein the partition angle of the commutation geometry is 45° or less.

16. The fluid controller according to claim 1, wherein the partition angle of the valve geometry is 60° or more.

17. The fluid controller according to claim 16, wherein the partition angle of the valve geometry is 90°.

18. The fluid controller according to claim 1, wherein the valve geometry comprises a supply section and a return section, wherein the supply section and the return section are arranged on different sides of the housing geometry.

19. The fluid controller according to claim 1, wherein the spool geometry comprises a pressure supply area extending in axial direction on both sides of the housing geometry.

20. The fluid controller according to claim 19, wherein the pressure supply area comprises a first part on one side of the housing geometry and a second part on the other side of the housing geometry, the first part and the second part running in circumferential direction, wherein the first part and the second part are connected by a third part running in axial direction and having a width in circumferential direction smaller than the first part and the second part.

* * * * *